United States Patent
Brown

(10) Patent No.: US 6,195,691 B1
(45) Date of Patent: Feb. 27, 2001

(54) METHOD AND APPARATUS FOR CREATING AND USING DYNAMIC UNIVERSAL RESOURCE LOCATORS

(75) Inventor: David Bennett Brown, Orange, TX (US)

(73) Assignee: National Systems Corporation, Chicago, IL (US)

( * ) Notice: Under 35 U.S.C. 154(b), the term of this patent shall be extended for 0 days.

(21) Appl. No.: 08/714,990

(22) Filed: Sep. 17, 1996

(51) Int. Cl.$^7$ ............................................. G06F 15/16
(52) U.S. Cl. ..................... 709/219; 709/217; 709/226; 709/229; 709/230; 709/249
(58) Field of Search ..................... 709/219, 217, 709/226, 229, 230, 249, 216

(56) References Cited

U.S. PATENT DOCUMENTS

| | | | |
|---|---|---|---|
| 5,021,993 | * 6/1991 | Matoba et al. | 364/900 |
| 5,136,636 | * 8/1992 | Wegrzynowicz | 379/207 |
| 5,341,477 | * 8/1994 | Pitkin et al. | 395/200 |
| 5,371,852 | * 12/1994 | Attanasia et al. | 395/200 |
| 5,412,654 | * 5/1995 | Perkins | 370/94.1 |
| 5,426,427 | * 6/1995 | Chinnock et al. | 340/827 |
| 5,452,447 | * 9/1995 | Nelson et al. | 395/650 |
| 5,493,692 | * 2/1996 | Theimer et al. | 455/26.1 |
| 5,610,910 | * 3/1997 | Focsaneanu et al. | 370/351 |
| 5,673,322 | * 9/1997 | Pepe et al. | 308/49 |
| 5,751,956 | * 5/1998 | Kirsch | 395/200.33 |
| 5,751,961 | * 5/1998 | Smyk | 395/200.47 |
| 5,777,989 | * 7/1998 | McGarvey | 370/254 |
| 5,878,126 | * 3/1999 | Velamuri et al. | 379/219 |

* cited by examiner

*Primary Examiner*—Dung C. Dinh
*Assistant Examiner*—Dzung C Nguyen
(74) *Attorney, Agent, or Firm*—Dick & Harris

(57) ABSTRACT

The present disclosure discloses a method for creating and using a dynamic universal resource locator to link an internet end user to a host selected from two or more hosts on the internet. The method comprises the steps of: (a) obtaining information related to either or both of the end user and/or the two or more hosts; (b) selecting, based upon the obtained information, one of the two or more hosts; and (c) generating a link to the selected host. Also disclosed is a method for connecting a user to a dial-up host having an internet domain name and a temporary internet address. This method comprises the steps of: (a) registering the temporary internet address of the dial-up host with the dynamic domain name server; (b) intercepting a locator request for the domain name of the dial-up host by returning the internet address of the company server; (c) processing requests from the user on the company server; and (d) providing the user with the temporary internet address of the dial-up host upon reaching a predetermined point in the programming of the company server.

1 Claim, 3 Drawing Sheets

METHOD AND APPARATUS FOR CREATING AND USING DYNAMIC UNIVERSAL RESOURCE LOCATORS

BACKGROUND OF THE INVENTION

1. Field of the Invention

The present invention relates in general to communication between computers over the internet and, in particular, to a method and apparatus creating and using dynamic universal resource locators (URLs).

2. Background Art

As access to the internet has increased dramatically in recent years, almost anyone with a computer can communicate with other computers to seek out various types of information, e-mail messages to other computer users, download files from remote computers and perform many other processes. In fact, it is the interconnection of these computers, via routers and other elements, using TCP/IP (transmission control protocol/internet protocol) that defines the internet. Once connected to the internet a user typically uses a software application program known as a "browser". To connect to the internet a typical end user utilizes the services of an Internet Service Provider (ISP) who maintains one or more computers which are connected directly to the Internet.

Internet protocol (IP) bundles the information being sent between two computers connected to the internet with the addresses for both the source and destination computers. These addresses are formed from four numbers, each less than 256, an example of which may appear as: 101.222.345.4. Transmission control protocol (TCP) governs the format in which the packets of data are transmitted. TCP breaks the information to be sent into manageable pieces for transmission, collects the pieces upon receipt, extracts the data, puts it in proper order, requests retransmission if any pieces are missing and verifies validity of the information using a checksum or other error-detection protocol.

Fortunately, most users do not have to concern themselves with the intricacies of TCP/IP because the TCP protocol is executed by the particular internet application software being used (such as a "browser"), generally without user intervention, and in view of the internet's use of domain names. Rather than force users to use actual numerical IP addresses, which are difficult for a user to remember or recognize, the internet provides for the use of domain names. For example, a computer maintained by the U.S. Internal Revenue Service may have the name "IRS.GOV" as its Domain Name, while one operated by the Acme Mouse Trap Company may have the name "MOUSETRAP.COM" as its domain name.

One very useful feature of the internet is the implementation of linking whereby the user when viewing a given page of text and graphics supplied by the computer to which the user has connected may be presented with highlighted text or graphics which comprise other "destinations" on the internet. Such highlighted portions of text, termed "hypertext" or graphics, signify links which may be selected by the user. For the user to connect to any of the listed destinations (as represented by the links) the user need only select the portion of highlighted text or graphics. In operation, when the user selects the hypertext link or graphics the user is in fact causing a domain name or IP address permanently associated with the hypertext or graphic to be used by the browser software as the next "destination." In practice, the specific domain name or IP address associated with the hypertext link or graphic is generated by the computer to which the user has connected.

Unfortunately, in view of the association of domain names with IP addresses a user if often presented with duplicate hypertext choices each of which accomplish the same task albeit from different computers. As an example, a computer may offer the user the ability to download specific files from any one of multiple computer sites. The user is typically presented with a hypertext listing for each site and must guess which site is most advantageous for his or her use, e.g. which is least busy and thus which might download the desired data quicker. Another example is found in a type of business having multiple internet hosts is a business at distributed locations. While each of these locations may have unique information and processes which can be provided via the internet, the business may want outside users who attempt to directly access any of the distributed sites to exprience some degree uniformity regardless of which site is accessed.

Accordingly, it is an object of the invention to present to the user a single hypertext link, customized for the particular user, based upon predefined criteria. It is an associated object to provide a method and apparatus for allowing a central internet host to intercept a request to connect to a particular site and service at least a portion of the communication with the end user through the central server.

These and other objects of the present invention will become apparent to those of ordinary skill in the art in light of the present specification, drawings and claims.

SUMMARY OF THE INVENTION

The present invention comprises a method for creating and using a dynamic universal resource locator to link an end user to a selected host from two or more hosts on the internet. The method comprising the steps of: (a) obtaining information related to either or both of: (1) the end user and/or (2) each of the two or more hosts; (b) selecting, based upon the obtained information, a particular host; and (c) generating a link to the selected host.

The present invention further comprises a method for connecting a user to a dial-up host having an internet domain name and a temporary internet address. The method comprises the steps of: (a) registering the temporary internet address of the dial-up host with a dynamic domain name server; (b) intercepting a locator request for the domain name of the dial-up host by returning the internet address of the company server; (c) processing requests from the user on the company server; and (d) providing the user with the temporary internet address of the dial-up host upon reaching a predetermined point in the programming of the company server.

As discussed hereinbelow, these methods have application to numerous situations and are only limited as indicated by the claims appended hereto.

DETAILED DESCRIPTION OF THE DRAWINGS

Figure 1:
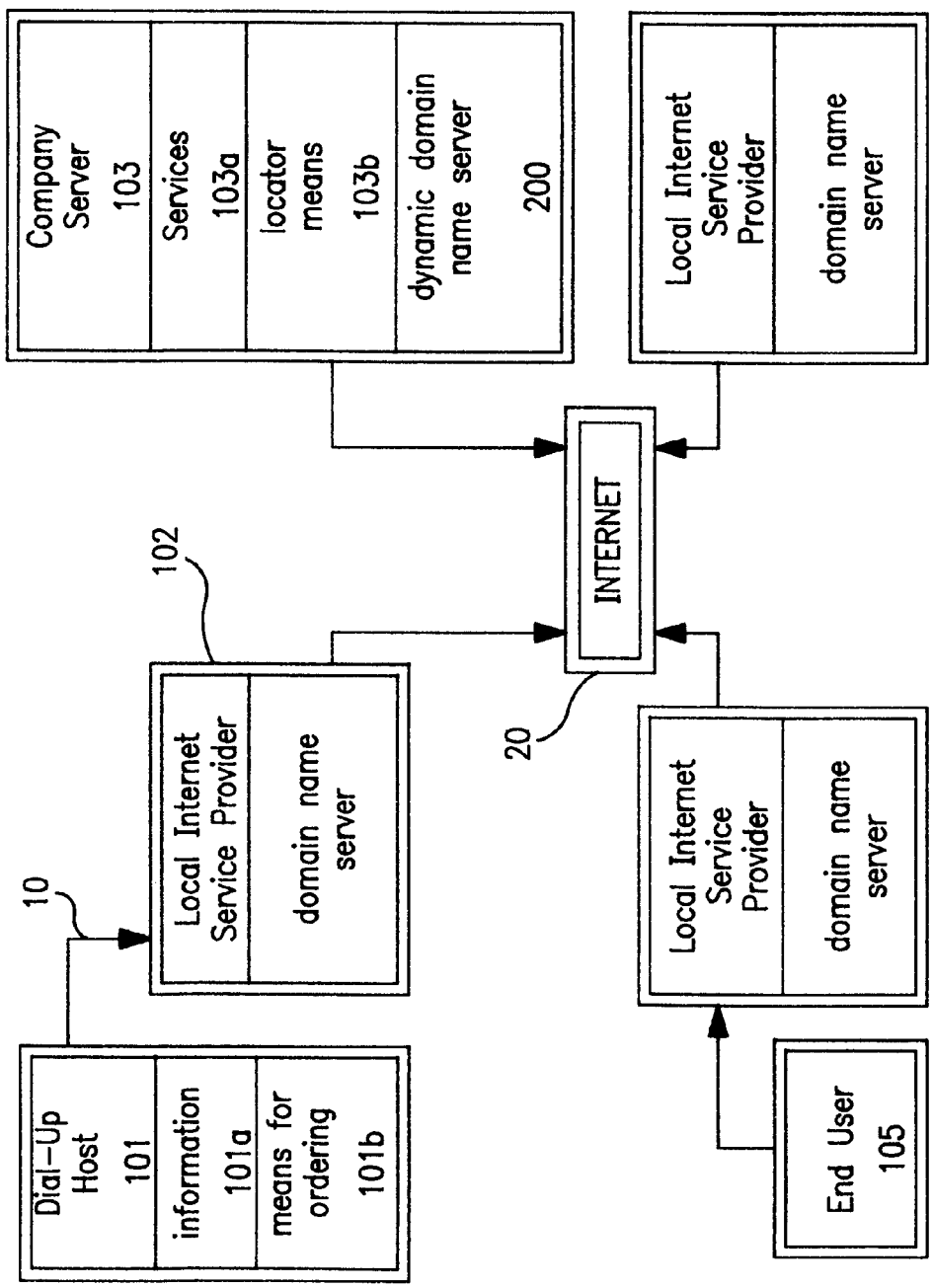
FIG. 1 of the drawings is a block diagram of the interconnection of the Internet, dynamic domain name server, dial-up host and other end users.

While this invention is susceptible of embodiment in many different forms, there is shown in the drawings and will herein be described in detail, a number of specific embodiments with the understanding that the present disclosure is to be considered as an exemplification of the principles of the invention and is not intended to limit the invention to the embodiments illustrated.

FIG. 1 illustrates, among other things, the interconnection of the elements of a system demonstrating the operation and utility of the present invention. For purposes of this disclosure illustrated are: company server 103 connected to internet 20 on dedicated basis; affiliated host computer 101 (representing one of N number of like configured, host computers), and an end user 105 who connects to the internet 20 via a local service provider 106. Of course, it would be understood by those of ordinary skill in the art that the present disclosure applies equally to intranet-based systems as to internet-based systems.

Company server 103, as is well-known to those of ordinary skill in the art, is a computer (multi-purpose or special-purpose) containing internet software that communicates with one or more end users, other hosts and/or other servers (not shown) via internet 20. Company server 103 preferably supplies services 103a for many internet functions (Telnet, FTP, World Wide Web, etc.) and the means for permitting access to such services by the public.

The scope of information contained in company server 103 is potentially limitless. Many companies use their web servers to provide advertisements, locations of local stores, current company catalogs and other information related to company's business. Other companies provide news, sports, weather and stock quotes, just to name a few types of the information that could be available on company server 103 on internet 20. Often times this information includes links to other pieces of information.

Figure 2:
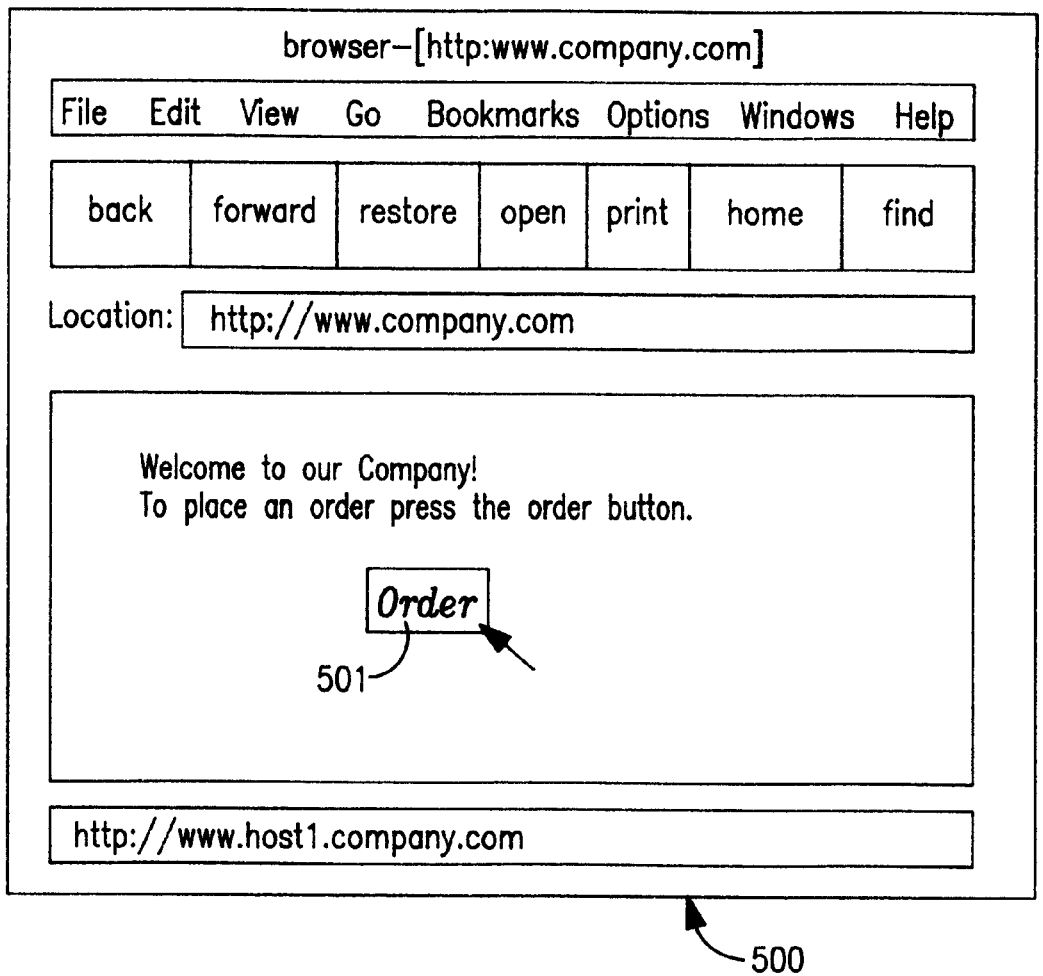
FIG. 2 of the drawings is front elevational view of a web page having a hypertext link to another web page at a different internet address.

For instance, as shown in FIG. 2 web page 500 has link 501. Link 501 serves to change the source of information for end user 105 from current web page 500 to another page either at the same or different internet address. In any event, these links are relatively static—affecting at most the sub-addressing of a particular server. However, there are instances where altering the domain name underlying link 500 to provide end user 105 with access to a particularly positioned host would be desirable.

In one example, a company may make various software programs available to the public for downloading over the internet. In view of the time typically required to complete such a download and the load placed on the computer host servicing such download requests, it is advantageous for the company to make the software available on a number of distributed hosts, which may even be located in different cities. Rather than present end user 105 with multiple links (each with an underlying URL) for each of the distributed hosts, company server 103 dynamically generates and presents a single link (with its associated URL). The particular URL associated with this link would dynamic. In this case, company server 103 may determine which of affiliated host computers 101 is the least most recently used or which is the least "busy" by either obtaining (and saving) data regarding the type of link desired by the user before establishing the new link or by obtaining usage information directly from each affiliated host computer regarding current usage statistics. Other methods for selecting one of many potential hosts for user connection will become obvious in light of this and other examples contained within the present disclosure.

In another example, company server 103 is used to facilitate the ordering of the company's goods and/or services by end user 105. Often times, the company may want or need to provide for such ordering, or servicing of a user's request, at a particular one of several distributed host computers, such as affiliated host computer 101, depending upon various criteria. In one preferred embodiment of this example, company server 103 may contain information 103a, such as advertisements, national specials, and store locations as well as locator means 103b for determining which local outlet should handle the end user's order. Based upon the determination by locator means 103b, the URL underlying link 501 will link end user 105 upon "clicking" that link to the particular affiliated host computer 101 via its assigned domain name. Of course, depending upon of end user 105 position within the particular selection criteria (i.e. zip code, size of user's business, etc.), the domain of link 501 is dynamically generated so as to redirect end user 105 to the one appropriate local host.

Each affiliated host computer 101 preferably comprises a multi-purpose computer containing various programs and information and are connected to internet 20. In this example, affiliated host computer 101 may contain information 101a, such as local advertisements (such as current specials), store hours, menus, and a means for ordering 101b, such as food for delivery from the store in which affiliated host computer 101 resides. Thus, after reviewing current specials and the menu, end user 105 would place his order via his computer. Once entered, the order would be processed by affiliated host computer 101.

As is known, each affiliated host computer 101 generally has a permanent IP address that is known to one or more domain name servers distributed throughout internet 20. However, it is within the scope of the present invention for affiliated host computer 101 to have a temporary IP address, which is handled in a manner disclosed in a co-pending application filed by the same inventor as the present disclosure. The invention disclosed in that co-pending application allows such hosts to have a "dial-up" internet account or other non-permanent connection to a company server, which theoretically results in assignment of a different IP address on each dial-in to the local internet service provider.

Figure 3:
FIG. 3 of the drawings is block diagram of one possible database content for the subdomain name database contained in the dynamic domain name server.

As disclosed in that co-pending application, the system would also include dynamic domain name server 200 having secondary domain name database 201 (FIG. 3) and means for updating information within database 201 and means for retrieving information from database 201. In that embodiment, as each of the dial-up hosts 101 connect to internet 20 on a dial-up basis via local internet service providers, they register their currently associated IP address in the database in a manner disclosed in the co-pending application. Thus, when end user 105 seeks a link with one of the company's local hosts, the link can be provided in the normal course of internet communications.

In the dynamic domain name example, the dynamic URL may have particular usefulness. For instance, a company using the dynamic domain name server that desires to have control and uniformity among the "pages" presented to users connecting to its company server 103 and its affiliated host computers 101, may "misdirect" an end user inquiry directly to the domain name of one of the company's local servers to company server 103 by returning the IP address of company server 103, rather than the current IP address for HOSTN, to end user 105. As a result, end user 105 will connect to company server 103, which will provide, at least the initial, service to the various the inquiries generated by end user 105. If a point is reached when direct connect to the local host computer is necessary, this connection would be achieved using a dynamic URL link.

In particular, end user 105—logged into internet 20 via local service provider 106—instructs the browser program running on his computer that he wants to contact HOSTN.COMPANY.COM. Local internet service provider 106 searches for this name in its local domain name server 106*a*. Unable to find an entry for HOSTN.COMPANY.COM, domain name server 106*a* sends an inquiry over internet 20 to COMPANY.COM (IP=mmm.mmm.mmm.m), which address is known to domain name server 106*a*. In this example, dynamic domain name server 200 responds by returning the IP address of COMPANY.COM (IP=mmm.mmm.mmm.m), instead of the registered address of HOSTN, to local domain name server 106*a* and, in turn, to the browser program being used by end user 105. With this address loaded, the browser connects end user 105 to COMPANY.COM to view pages of information present thereon, such as items available for purchase. At such time as the user desires to place an order for goods the user 105 can be connected directly to the desired distributed host computer 101, HOSTN. Company server 103 would obtain the true IP address of HOSTN from dynamic secondary domain name server 200 by a particular inquiry that is only available to company server 103, possibly even via an unassigned, known internet port.

Another application for the present invention involves the home page for a news organization's presence on internet 20. In this embodiment, affiliated host computers 101 provide local news as it is inputted by the local staff of that new organization for dissemination on internet 20. In this example, as end user 105 logs onto company server 103 various inquiries as to the user's location may be performed through textual questions posed to the user. Based upon these answers, the various links to other servers having their own domain names would be appropriately updated to reflect the perceived user preferences.

The foregoing description and drawings merely explain and illustrate the invention and the invention is not limited thereto except insofar as the appended claims are so limited, as those skilled in the art who have the disclosure before them will be able to make modifications or variations therein without departing from the scope of the invention.

What is claimed is:

1. A method for connecting a user to a dial-up host having an internet domain name and a temporary internet address, in a system including:

an internet, a dynamic domain name server on the internet, a company server affiliated with the dial-up host and associated with the dynamic domain name server, the company server having an internet address and programming, a local internet service provider connected to the internet, the method comprising the steps of:

(a) registering the temporary internet address of the dial-up host with the dynamic domain name server;

(b) intercepting a locator request generated by the user seeking to contact the domain name of the dial-up host and returning the internet address of the company server;

(c) processing requests from the user on the company server; and (d) providing the user with the temporary internet address of the dial-up host upon reaching a predetermined point in the programming of the company server.

* * * * *